United States Patent [19]
Tanibata

[11] Patent Number: 5,859,689
[45] Date of Patent: Jan. 12, 1999

[54] IMAGE PRINTER

[75] Inventor: Toru Tanibata, Wakayama, Japan

[73] Assignee: Noritsu Koki Co., Ltd., Sakayama-ken, Japan

[21] Appl. No.: 587,876

[22] Filed: Jan. 11, 1996

Related U.S. Application Data

[63] Continuation of Ser. No. 245,995, May 19, 1994, abandoned.

[30] Foreign Application Priority Data

May 28, 1993 [JP] Japan .................................... 5-126684

[51] Int. Cl.$^6$ .................................................. G03B 27/74
[52] U.S. Cl. .............................. 355/50; 355/35; 355/40; 355/41; 355/68; 355/70
[58] Field of Search ................................. 355/35, 40, 41, 355/68, 70

[56] References Cited

U.S. PATENT DOCUMENTS

| | | |
|---|---|---|
| 4,368,484 | 1/1983 | Stemme . |
| 5,017,014 | 5/1991 | Terashita ..................................... 355/35 |
| 5,023,652 | 6/1991 | Purro ...................................... 355/68 X |
| 5,249,017 | 9/1993 | Kokura ....................................... 355/68 |
| 5,253,011 | 10/1993 | Zahn et al. ................................ 355/41 |
| 5,337,119 | 8/1994 | Tanibata ..................................... 355/40 |

FOREIGN PATENT DOCUMENTS

| | | |
|---|---|---|
| 3704052 | 8/1987 | Germany . |
| 9009619 | 8/1990 | WIPO . |

*Primary Examiner*—Daniel P. Malley
*Attorney, Agent, or Firm*—Townsend and Townsend and Crew LLP

[57] ABSTRACT

An image printer includes a negative-film projection exposure unit capable of projecting and exposing image information of a negative film on to a photosensitive material adapted for negative films and a positive-film exposure unit capable of exposing image information of a positive film on to the photosensitive material adapted for negative films.

5 Claims, 4 Drawing Sheets

IMAGE PRINTER

This is a Continuation of application Ser. No. 08/245,995 filed May 19, 1994, now abandoned.

BACKGROUND OF THE INVENTION

1. Field of the Invention

The present invention relates to an image printer.

2. Description of the Related Art

As an image printer for exposing a photosensitive material with an image recorded on a film, there has been generally used an image printer operable to project and expose the film image on to the photosensitive material.

The film usually used for such image printer comprises a negative film. Yet, there sometimes arises an occasion when an image recorded on a positive film must be exposed on to the photosensitive material.

In order to cope with such situation, it has been necessary to prepare not only, an image printer charged with a photosensitive material and processing liquids for the negative film but also a further image printer charged with a photosensitive material and processing liquids for the positive film. This has been very uneconomical and improvement has been desired in this respect.

The present invention attends to the above-described state of the art, and a primary object of this invention is to provide an improved image printer capable of exposure processing of both a negative film and a positive film, thereby to reduce the system cost of the image printer.

SUMMARY OF THE INVENTION

For accomplishing the above-noted object, an image printer, according to the present invention, comprises:

- a negative-film projection exposure unit capable of projecting and exposing image information of a negative film on to a photosensitive material adopted for negative films; and
- a positive-film exposure unit capable of exposing image information of a positive film on to said photosensitive material adapted for negative films.

According to the above-described construction, in case image information of a negative film is to be exposed on to the photosensitive material adapted for negative films, the negative film is charged to the negative-film projection exposure unit to be exposed at a high speed. Whereas, in case image information of a positive film is to be exposed on to the photosensitive material adapted for negative films, the positive film is charged to the positive-film exposure unit so as to be exposed thereby. That is to say, the image information of either a negative film or a positive film may be exposed on to the negative-film photosensitive material.

As a result, as the single image printer may cope with exposures of both a negative film and a positive film, the system cost may be reduced.

Further, since both the projection exposure units use the same kind of photosensitive material adapted for negative films, the processing liquids too may be of the same type for negative films. In this respect, it is conceivable to construct the image printer from the simple combination of the negative-film projection exposure unit for projecting and exposing negative film image information on to the photosensitive material adapted for negative film and a positive-film exposure unit for exposing positive film image information on to photosensitive material adapted for positive films. However, in comparison with this further construction, the above-described construction of the present invention provides the advantage of eliminating troubles of maintenance of two different kinds of photosensitive material and processing liquids. Thus, the image printer of the present invention is more convenient than such construction.

According to one aspect of the present invention, the positive-film projection exposure unit is adapted to effect the exposure of the positive film image information by reading the positive film image information by reader means and then converting this read image information into image information to be exposed on to the negative-film photosensitive material.

With the above-described construction, for exposing negative film image information on to the negative-film photosensitive material, the negative film will be charged to the negative-film projection exposure unit to be exposed speedily thereby. On the other hand, for exposing positive film image information on to the negative-film photosensitive material, first, this positive film image information will be read by the reader means and this read image information will be converted into the image information to be exposed on to the negative-film photosensitive material. Thereafter, the negative-film photosensitive material will be exposed with this converted image information.

One conceivable construction of the positive-film exposure unit, i.e. the construction for exposing the positive film image information on to the negative-film photosensitive material, will be that the positive film image information is first printed on to a negative film and after developing this negative film the image information of this developed negative film is exposed on to the negative-film photosensitive material. However, in comparison with such construction, the construction provided with the above-described second characterizing features of the present invention advantageously allows the exposure of the positive film image information on to the negative-film photosensitive material by means of very simple arrangement.

Then, as simple construction allows the exposure of the positive film image information on to the negative-film photosensitive material, the invention achieves the achieves the advantage of further reduction in the system cost of the image printer.

According to a further aspect of the present invention, the printer further comprises transport means for transporting the negative-film photosensitive material through the negative-film projection exposure unit and the positive-film exposure unit, a control unit for controlling operations of the negative-film projection exposure unit, the positive-film exposure unit and of the transport means, and instructing means for instructing either a negative film mode or a positive film mode to the control unit, wherein, with an instruction for the negative film mode, the control unit, effects control operations for causing the photosensitive material to be exposed at the negative-film projection exposure unit and with an instruction for the positive film mode, the control unit effects control operations for causing the photosensitive material to be exposed at the positive-film exposure unit.

According to the above-described construction, when the transport means transports the negative-film photosensitive material through the negative-film exposure unit, if the instruction from the instructing means is for the negative film mode, the control unit executes the control scheme for causing the image information of the charged negative film to be projected and exposed on to the negative-film photosensitive material at the negative-film projection exposure unit.

On the other hand, if the instruction from the instructing means is for the positive film mode, the control unit executes the further control scheme for causing the image information of the charged positive film to be projected and exposed on to the negative-film photosensitive material at the positive-film exposure unit.

As a result, with the simple arrangement of using the transport means for transporting the negative-film photosensitive material through the negative-film projection exposure unit and the positive-film exposure unit and of giving from the instructing means the instruction for the negative film mode or for the positive film mode, the printer may process both negative and positive films. Thus, with restriction of the apparatus construction complexity, this printer will prove even more convenient.

According to a still further aspect of the present invention, the reader means is adapted to read image information of a film charged to film feed means for feeding the film to the negative-film projection. exposure unit.

With the above-described construction, if the film charged to the film feed means comprises a positive film, with feeding of the film from the film feed means, the reader means reads the image information of the film charged to the film feed means. Then, based on this read information, the positive-film exposure unit is activated. On the other hand, if the film charged to the film feed means comprises a negative film, the film feed means feeds this film to the negative-film projection exposure unit.

As a result, since the reader means reads the information of the film charged to the film feed means, it becomes possible for the negative-film projection exposure unit and the positive-film exposure unit to share the film feed means, so that it is not necessary to discriminate the charging position of the film at the two projection exposure units.

Further, although the reading operation of the film image information by the reader means requires a relative movement between the reader means and the film, the reader means may reed this film image information by utilizing the film feeding movement by the film feed means.

With this, the image printer will prove even more convenient while avoiding complexity of the apparatus construction.

According to a still further aspect of the present invention, the printer further comprises detecting means for detecting information about whether the film charged to the film feed means for feeding a film to the negative-film projection exposure unit is a negative film or a positive film, so that the instructing means selectively provides an instruction for the negative film mode or the positive film mode based on the information detected by the detecting means.

According to the above-described construction, if the detecting means detects that the film charged to the film feed means comprises a negative film; then, based on this detection information, the instructing means selectively provides the instruction for the negative film mode. On the other hand, if the detecting means detects that the film charged to the film feed means comprises a positive film; then, based on this detection information, the instructing means selectively provides the instruction for the positive film mode. Thereafter, in accordance with this instruction from the instructing means, the control unit executes the control scheme for either the negative-film projection exposure unit or the positive-film exposure unit.

As a result, since the detecting means detects whether the film is a negative film or a positive film and the mode selection between the negative film mode or the positive film mode is effected based on this detection information, it is not necessary for effect an input operation for instructing a mode selection. Thus, the image printer with this feature will be more convenient.

According to a still further aspect of the present invention, the positive-film exposure unit is adapted to be selectable between the positive film mode in which the image information of a positive film read by the reader means is converted into image information to be exposed on to the negative-film photosensitive material and the negative film mode in which the image information of a negative film read by the reader means is converted into image information to be exposed on to the negative-film photosensitive material.

With the above-described construction, in the case of the positive film mode, the positive-film exposure unit converts the positive film image information read by the reader means into image information to be exposed on to the negative-film photosensitive material.

Moreover, in the case of the negative film mode, the negative film image information read by the reader means is converted into image information to be exposed on to the negative-film photosensitive material.

As a result, since the negative film image information read by the reader means is converted into image information to be exposed on to the negative-film photosensitive material, at the positive-film exposure unit, the negative film image information too may be exposed on to the photosensitive material. Thus, when the exposure processing capacity of the negative-film projection exposure unit has reached its limit, the positive-film exposure unit may auxiliary effect the exposure processing of the negative film. Or, when a trouble has developed in the negative-film projection (exposure unit, the positive-film exposure unit may temporarily effect the exposure, processing of the negative film. In these manners, it becomes possible to diversify the processing functions of the image printer, thereby to further improve the convenience of the image printer.

Further and other objects, features and effects of the invention will become apparent from the following more detailed description of the embodiments of the invention with reference to the accompanying drawings.

DESCRIPTION OF THE PREFERRED EMBODIMENTS

Now, preferred embodiments of an image printer according to the present invention will be described in details with reference to the accompanying drawings.

Figure 1:
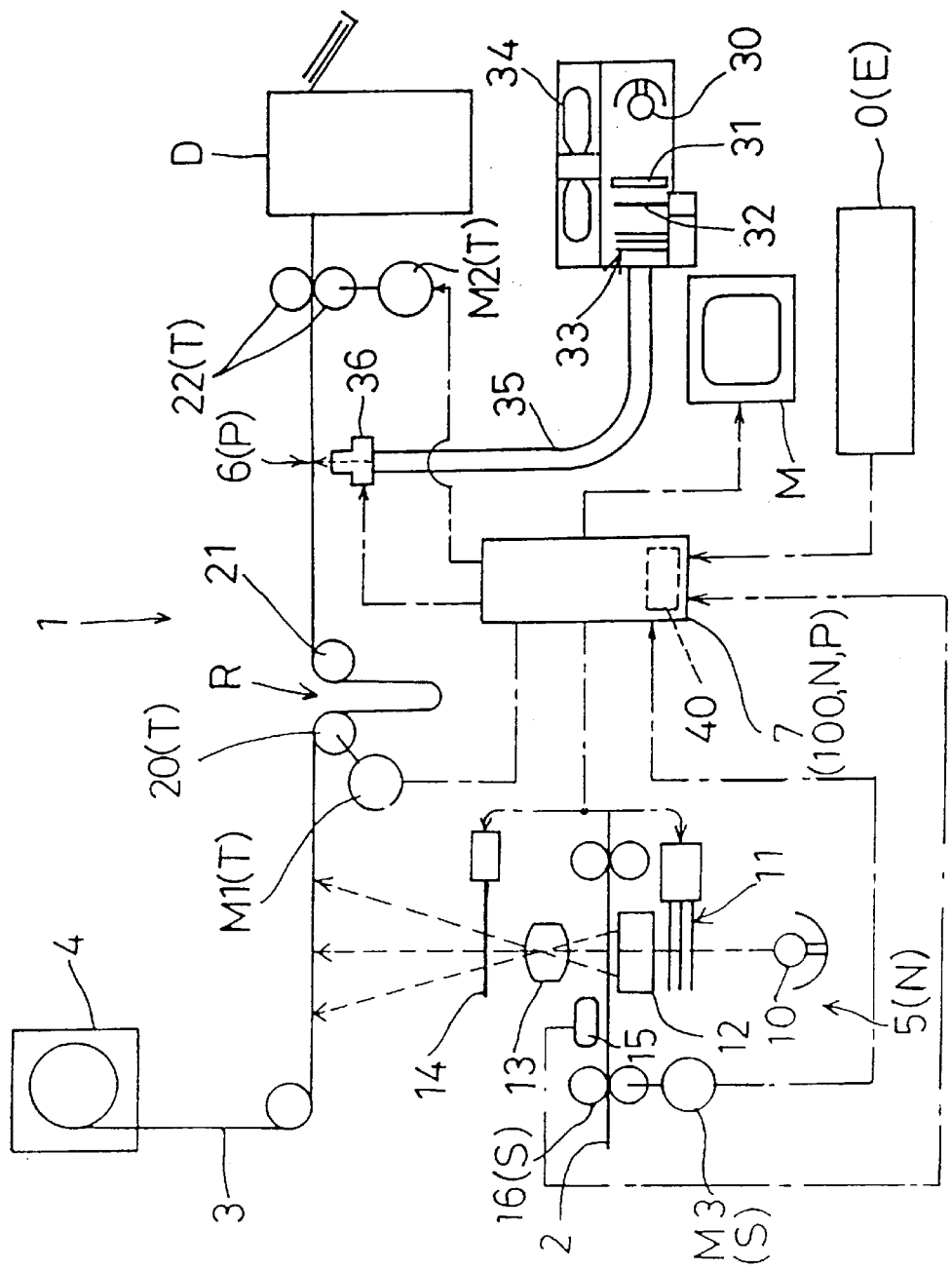
FIG. 1 is a schematic construction view of an image printer according to one preferred embodiment of the present invention.

As shown in FIG. 1, an image printer 1 includes a projection exposure unit 5 for projecting and exposing image information of a film 2 on to a negative-film print paper 3 as a photosensitive material, a moving exposure unit 6 for dividing the image information to be exposed on to the print paper 3 into a plurality of lines and then exposing each line, a loop forming unit R for allowing a transporting operation of the print paper 3 at the projection exposure unit 5 and the moving exposure unit 6 independently of each other, a developing unit D for developing the print paper 3 having been exposed at either the projection exposure unit 5 or the moving exposure unit 6, and a controller 7 for controlling the above-described components of the image printer 1. This controller 7 is connected to a control panel O for effecting various instruction input operations and to a monitor device M for displaying the image information.

Then, after the print paper 3 is withdrawn from a print paper holder 4 in which the printer paper 3 is stored in a rolled state, the print paper 3 is exposed at either the projection exposure unit 5 or the moving exposure unit 6 and then is developed at the developing unit D. Then, the print paper is cut into a paper strip including one-frame amount of image information and discharged from the printer.

This image printer 1 operates in two modes, i.e. a negative film mode and a positive film mode. In the case of the negative film mode in which the film 2 comprises a negative film, image information of the film 2 is projected and exposed on to the print paper 3 at the projection exposure unit 5. In the case of the positive film mode in which the film 2 comprises a positive film, image information of the film 2 is exposed on to the print paper 3 at the moving exposure unit 6. Which of these two operation modes to be effected is selected by an input of instruction from the control panel O.

Next, the respective components will be specifically, described.

The projection exposure unit 5 includes a projection exposure light source 10, a light modulating filter 11 for adjusting color balance of the light to be irradiated on to the film 2, a mirror tunnel 12, for uniformly mixing color components of the light having passed on light modulating filter 11, a printing lens 13 for printing the image information of the film 2 on to the print paper 3, and a shutter 14, with these components being arranged along a same optical path.

On the upstream side of the transport passage of the film 2 relative to the projection exposure unit 5, there is disposed an image sensor 15 for reading the image information of the film 2 with the information being divided into a number of areas. This image sensor 15 irradiates white beam on to the film 2, resolves its reflected or transmission light into three primary color components of red, green and blue, so that intensity of each component is measured by e.g. a CCD line sensor. The image information read by this image sensor 15 is used both in exposure at the projection exposure unit 5 and in exposure at the moving exposure unit 6.

On the upstream side of the transport passage of the film 2 relative to the image sensor 15, there are disposed a roller 16 for feeding the film 2 to the projection exposure unit 5 and a motor M3 for rotably driving the roller 16.

At the projection exposure unit 5, based on the image information read by the image sensor 15 in association with the feeding operation of the film 2 by the roller 16 and the motor 13, the controller 7 controls the light modulating filter 11 to adjust the irradiation beam of the projection exposure light source 10 to a color balance according to the color densities of the image of the film 2. Thereafter, this adjusted light is irradiated to the film 2 so as to print the image information of the film 2 on to the print paper 3.

The loop forming unit R includes rollers 20, 21 for transporting the print paper 3 and a motor M1 for rotatably driving the roller 20. Between the roller 20 disposed on the upstream side of the print paper transporting direction and the roller 21 disposed on the downstream side of the print paper transporting direction, though not shown, there is interposed a flap switchable between a condition for linearly guiding the print paper 3 between the rollers 20, 21 and a further condition for allowing formation of a loop of the print paper 3. With the formation of the loop, transport speeds of the print paper 3 at the projection exposure unit 5 and the moving exposure unit 6 may be set independently of each other.

The moving exposure unit 6 includes an exposure light source 30, an IR cut filter 31 for eliminating infrared beam component from the light emitted from the exposure light source 30, a shutter 32, a light modulating filter 33 for adjusting color balance of the light from the exposure light source 30, a PLZT print head 36, and an optical fiber bundle 35 for transmitting the light from the exposure light source 30 to the PLZT print head 36. And, the exposure light source 30, the IR cut filter 31, the shutter 32 and the light modulating filter 33 are accommodated inside a single casing together with a cooling fan motor 34.

The light modulating color filter 33 includes color filters of yellow (Y), magenta (M) and cyanogen (C), with the filters being independently projectable into a retractable from an optical path. Then, with projecting and retracting movements of the respective color filters, the light from the exposure light source 30 is switched over to one of exposing colors of e.g. red, green and blue.

The PLZT print head 36, though not shown, includes a great number of assemblies each consisting of PLZT interposed between a polarizer and an analyzer, with the assemblies being linearly arranged direction of the print paper 3. Then, by varying a voltage to be impressed to a pair of electrodes attached to each PLZT, the polarizing direction of the light passing between the electrodes is varied so as to selectively allow or inhibit the passage of the light through each PLZT. In this manner, the print head functions as a light shutter.

With the above, through the independent control of the voltages to be applied to the great number of PLZT and the switch-over of the light modulating filter 33 to a desired exposing color corresponding to the three primary color components of red, green and blue, an exposure amount is set for each of the areas together constituting the image information with respect to one-line amount of this image information, thereby to effect color exposure of the print paper 3.

On the downstream side of the print paper transporting passage relative to the moving exposure unit 6, there are disposed a roller 22 for transporting the print paper 3 and a motor M2 for driving this roller 22.

Under the control of the controller 7, at the moving exposure unit 6, the motor M2 and the moving exposure unit 6 effect exposure of one-line amount of image information after one another on to the print paper 3 with switching over the exposing colors. With completion of the exposures with all the exposing colors, by the drive of the motor M2, the roller 22 repeats transport of the print paper 3 by a distance corresponding to the one-line amount, with shifting the image information by one-line amount, so as to expose the print paper 3 with one-frame amount of image information.

The developing unit D, though not shown, includes a plurality of tanks filled with processing liquids for developing the exposed print paper 3. Thus, the print paper 3 is developed with its successive passage through these tanks.

Figure 2:
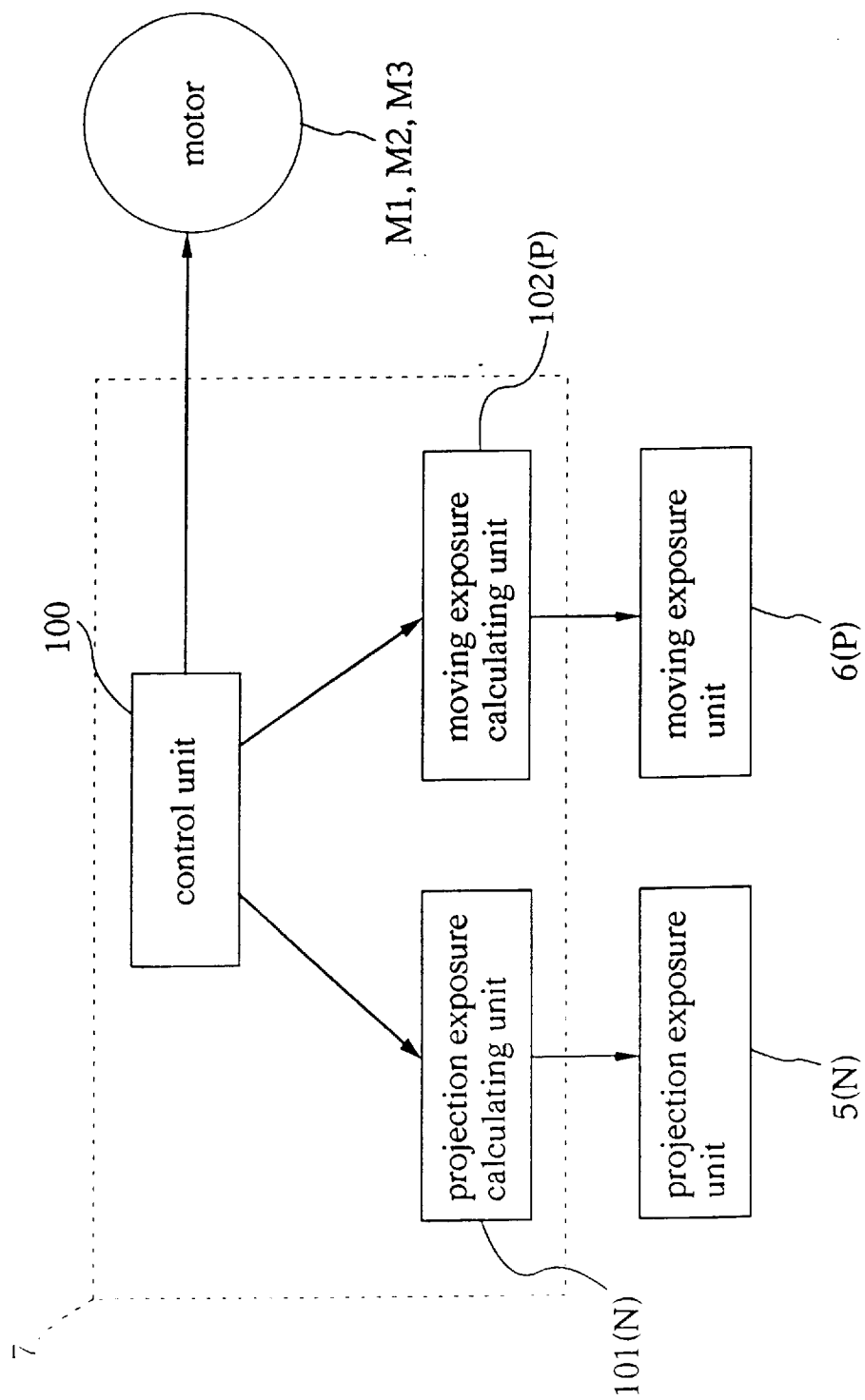
FIG. 2 is a diagram illustrating a control construction relating to the embodiment of the present invention.

The controller 7, as shown in FIG. 2, includes a projection exposure calculating unit 101 for executing calculation of image information relating to the projection exposure unit 5, a moving exposure calculating unit 102 for executing calculation of image information relating to the moving exposure unit 6, and a control unit 100 for executing total control of the operations of these calculating units 101, 102 and the operations of the projection exposure unit 5 and the moving exposure unit 6. In addition, the controller 7 further executes control of the operations of the respective motors M1, M2 and M3. These functions are stored as one integral program at a memory 40 incorporated with the controller 7. The memory 40 further stores other information such as the image information read by the image sensor 15.

Next, the control schemes executed by the controller 7 for controlling the operations of the respective components will be described with reference to a flow chart of FIG. 3.

First, the image information of the film 2 fed to the negative-film projection exposure unit N by feeding operations using the roller 16 and the motor M3 is read by the image sensor 15 as information of densities of the red, green, blue, three primary color components (step #1). Then, this read image information is calculated to be converted into data to be displayed on the monitor device M (step #2). In the course of this, if the film 2 comprises a negative film, it is necessary to convert the information of densities of the three primary color components into density information of the respective complementary color components.

With completion of the above-described calculation, based on the calculation result, the image information is displayed on the monitor device M (step #3). Alternatively, without effecting the information conversion in the case of the film 2 being a negative film, an operator may judge whether the film 2 is a negative film or a positive film by observing the display on the monitor device M and then input an instruction from the control panel O.

Next, it is judged whether the operation mode of the image printer 1 is presently set, to the positive film mode or to the negative film mode (step #4). If it is judged that the mode is set to the negative film mode, by using the calculation result obtained at step #2, the light modulating filter 11 is controlled to an optimal color balance (step #5).

Thereafter, by using the calculation result obtained at step #2, an exposure time period is calculated (step #6). Then, based on the calculation result of this exposure time period, the shutter 14 is operated to expose the print paper 3 (step #7).

On the other hand, if it is judged at step #4 that the mode is presently set to the positive film mode, this means that the image information of the film 2 comprises positive film image information. So that, this image information is converted into image information to be exposed on to the print paper 3 adapted for a negative film (step #8).

Figure 4B:
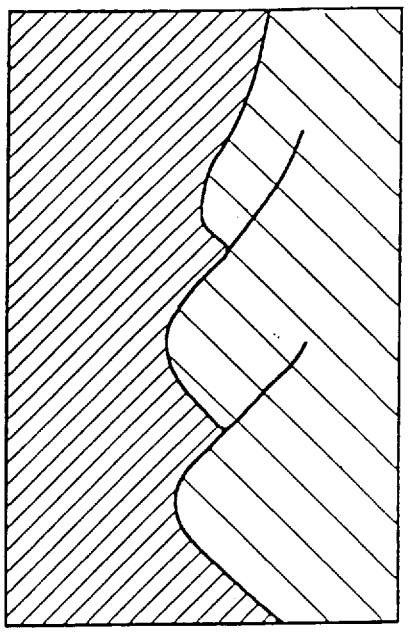
FIG. 4 is a view explaining image information conversion relating to the embodiment of the present invention.
Figure 4A:
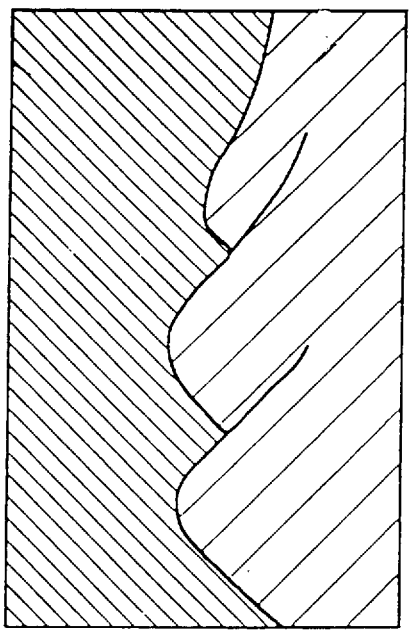

This conversion executed at step #8 is for converting the read density information into density information of respective complementary colors. For instance, in case the positive film image information is a view composed of blue sky and green mountains as illustrated in FIG. 4(a), this image information will be converted into information of a view composed of yellow sky and magenta mountains corresponding thereto as illustrated in FIG. 4(b). Incidentally, if the film is provided with some special base coloring or with significant color development concentration, the above-described conversion is effected so as to include such color information as well.

With completion of the calculation at step #8, an exposure time period is calculated for each of the three primary color components for each of the divided areas (step #9). Then, based on these calculation results, the print paper 3 is exposed at the moving exposure unit 6 in the above-described manner (step #10).

Accordingly, the projection exposure unit 5 and the controller 7 together function as a negative-film projection exposure unit N for projecting and exposing an image of a negative film on to the negative-film print paper. On the other hand, the moving exposure unit 6 and the controller 7 together function as a positive-film exposure unit P for exposing an image of a positive film on to the print paper 3.

The rollers 20, 21 and the motors M1, M2 together function as transport means T for transporting the print paper 3 through the projection exposure unit 5 and the moving exposure unit 6. The control panel O functions as instructing means E for instructing a switch over between the negative film mode and the positive film mode.

The controller 7 functions as the control unit 100 for controlling the negative-film projection exposure unit N, the positive-film exposure unit P and the transport means T. The roller 16 and the motor M3 together function as film feed means S for feeding the film 2 to the negative-film projection exposure unit N. The image sensor 15 functions as reader means for reading the image information of the film 2.

Next, other embodiments will be specifically described.

(1) In the foregoing embodiment, an operator inputs an instruction from the control panel O whether the film 2 is a positive film or a negative film. Alternatively, the image sensor 15 may be used as detecting means K for detecting the information concerning whether the film 2 charged to the film feed means S is a negative film or a positive film. Then, based of the detection information of this detecting means K, the negative film mode or the positive film mode will be selected.

More specifically, in judging whether the film comprises a negative film or a positive film based on the information read by the image sensor 15, the film will be judged as a negative film if the portion of this film 2 except for its image bearing area has a reddish brown color, while the film will be judged as a positive film if said portion of the film 2 has a black color, for instance. Alternatively, the film 2 will be judged as a negative film if its portion excluding the image-bearing portion has a density value lower than a minimum density value of the image-bearing area while the density value of the former is greater than that of the latter.

As the detecting means K, a further sensor for effecting the above-described judgment may be provided in addition to the image sensor 15.

(2) In the foregoing embodiment, the negative-film projection exposure Unit N and the positive-film exposure unit P commonly use such components as the controller 7, the film feed means is S and the transport means T. Instead, these components may be provided independently.

(3) In the foregoing embodiment, the positive-film exposure unit P processes positive films only. Instead in addition to the positive film mode for converting the positive film image information into image information to be exposed on to the print paper 3 adapted for negative films, the positive-film exposure unit P may be provided also with a negative film mode for converting image information of a negative film into image information to be exposed on to the negative-film print paper 3, so that this positive-film exposure unit P may process negative films also in addition to positive films.

Figure 3:
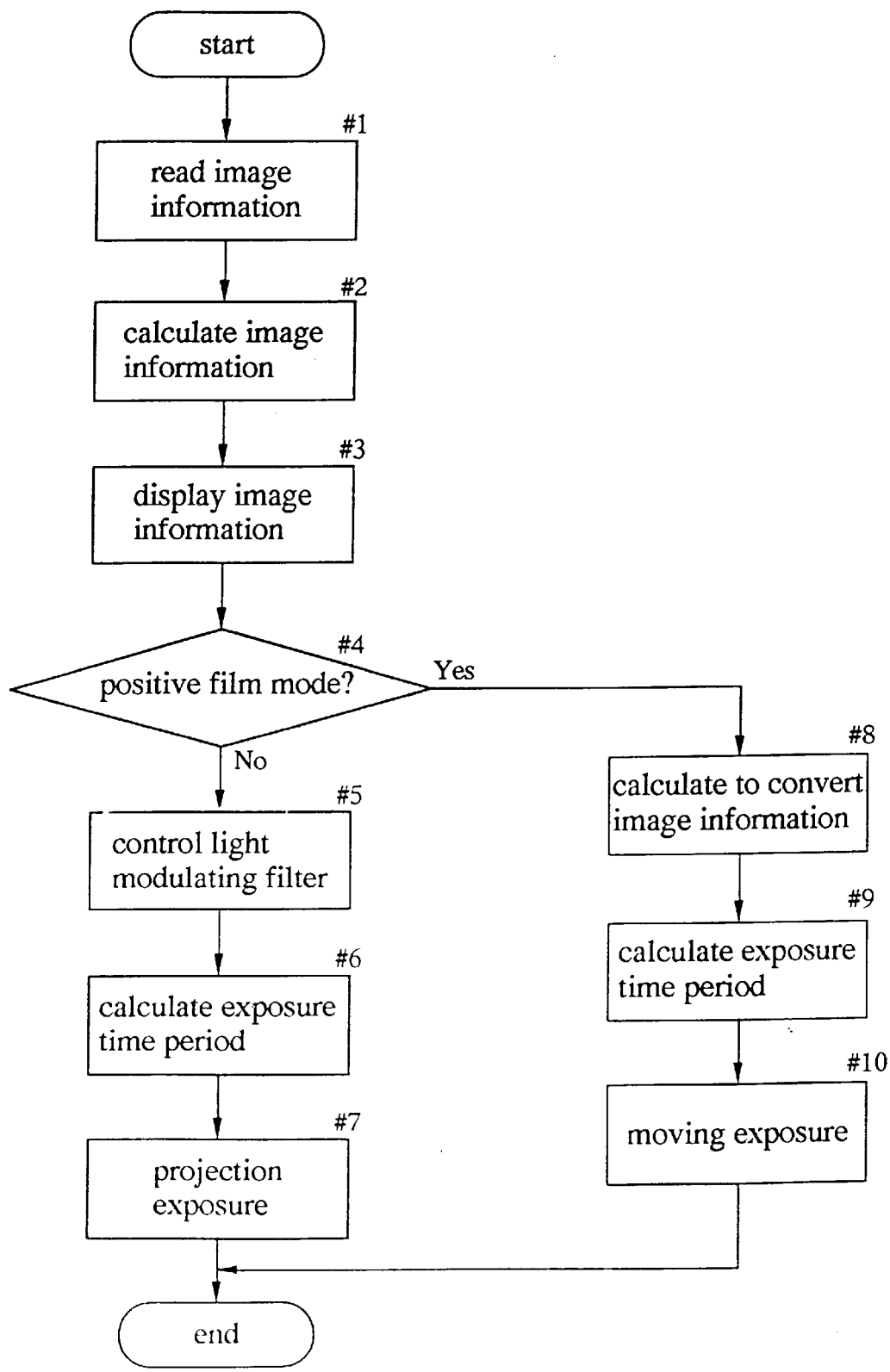
FIG. 3 is a flow chart relating to the embodiment of the present invention.

For effecting exposure of negative film image information at the positive-film exposure unit P, in the flow chart of FIG. 3, the process will skip step #8 and jump to step #9.

(4) In the foregoing embodiment, the moving exposure unit employs the light shutter using PLZT. Instead, a light shutter using liquid crystal elements may be used as the print head, for instance, Further, it is also conceivable to effect exposure using e.g. CRT with keeping the print paper 3 stationary.

(5) In the foregoing embodiment, at the moving exposure unit 6, the irradiation light from the exposure light source 30 is guided to the PLZT print head 36 by means of the optical fiber bundle 35. Alternately, the irradiation light from the exposure light source 30 may be converged on to the PLZT print head by means of a lens, for example.

(6) In the foregoing embodiment, in exposing the print paper 3 at the moving exposure unit 6, the one-line amount of exposure operation and the transporting operation of the print paper 3 for one-line amount are repeated in the alternating manner to effect exposure of each line of the image information. Instead of this, the exposure of each line of the image information may be effected one after another while the print paper 3 is being transported in a continuous manner at a fixed speed.

The invention may be embodied in other specific forms without departing from the sprit or essential characteristics hereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An image printer comprising:

a first exposure unit for projecting and exposing image information of a negative film on to a negative-film photosensitive material adapted for a negative film, said first exposure unit including a projection-exposure light source and a light modulating filter for adjusting balance of a light from said light source to be irradiated on to the negative film;

a second exposure unit for exposing the image information of the positive film on said negative-film photosensitive material;

a control unit for controlling operations of said first and second exposure units as well as of said transport means; and an image sensor for reading the image information of the negative film or the image information of the positive film supplied to said first exposure unit;

said control unit controlling the light modulating filter of the first exposure unit based on the image information of the negative film read by said image sensor, and said control unit converting the image information of the positive film read by said image sensor into image information to be exposed on said negative-film photosensitive material.

2. An image printer according to claim 1, wherein said image sensor reads the image information of the negative film or of the positive film, by dividing said image information into a number of areas.

3. An image printer according to claim 1, wherein said exposure unit is capable of selectively providing a first conversion mode for converting the image information of the positive film read by said image sensor into the image information to be used for the exposure of the negative-film photosensitive material and a second conversion mode for converting the image information of the negative film read by said image sensor into the image information to be used for the exposure of the negative-film photosensitive material.

4. An image printer according to claim 1, further comprising:

instructing means for instructing to said control unit either a negative film mode to effect the control operations for exposing the negative-film photosensitive material at the first exposure unit or a positive film mode to effect the control operations for exposing the photosensitive material at the second exposure unit, said instructing means automatically selecting and instructing either said negative film mode or said positive film mode, based on the image information read by said image sensor.

5. An image printer according to claim 1, further comprising:

transport means for transporting the negative-film photosensitive material through said first exposure unit and said second exposure unit.

* * * * *